United States Patent

[11] 3,548,900

[72] Inventor Norman E. Gaddini, Winters, Calif.
1060 Jonive Road, Sebastopol, Calif. 95472
[21] Appl. No. 759,680
[22] Filed Sept. 13, 1968
[45] Patented Dec. 22, 1970

[54] FREESTONE PEACH PITTING AND HALVING MACHINE
17 Claims, 11 Drawing Figs.

[52] U.S. Cl. .................................................. 146/28
[51] Int. Cl. .................................................. A23n 3/08
[50] Field of Search .......................................... 146/28, 28.1, 238

[56] References Cited
UNITED STATES PATENTS
517,588 4/1894 Rehm ......................... 146/28
2,664,932 1/1954 Gaddini ....................... 146/28
3,138,184 6/1964 Gaddini ....................... 146/28
3,370,625 2/1968 Loveland ..................... 146/238X Primary Examiner—Willie G. Abercrombie
Attorney—Webster & Webster ABSTRACT: A machine, for pitting and halving soft-fleshed, freestone fruit (such as freestone peaches), which comprises —in cooperative association with a rotary loader and in cyclically operative array—a swinging cup assembly arranged to support individual fruit, received from the loader, in a predetermined position between initially separated blade units which then close and cut the fruit all about the pit and into fruit halves, there being retention means which —upon such cutting of the fruit and accompanying swinging away of the cup assembly—lock the pit against motion in a certain direction, and pushers thence operative to simultaneously engage and push the cut fruit halves in such direction and relative to the locked-in-place pit so that such pit then acts as an internal wedge which causes the cut fruit halves to effectively separate from the pit as such halves are moved by said pushers.

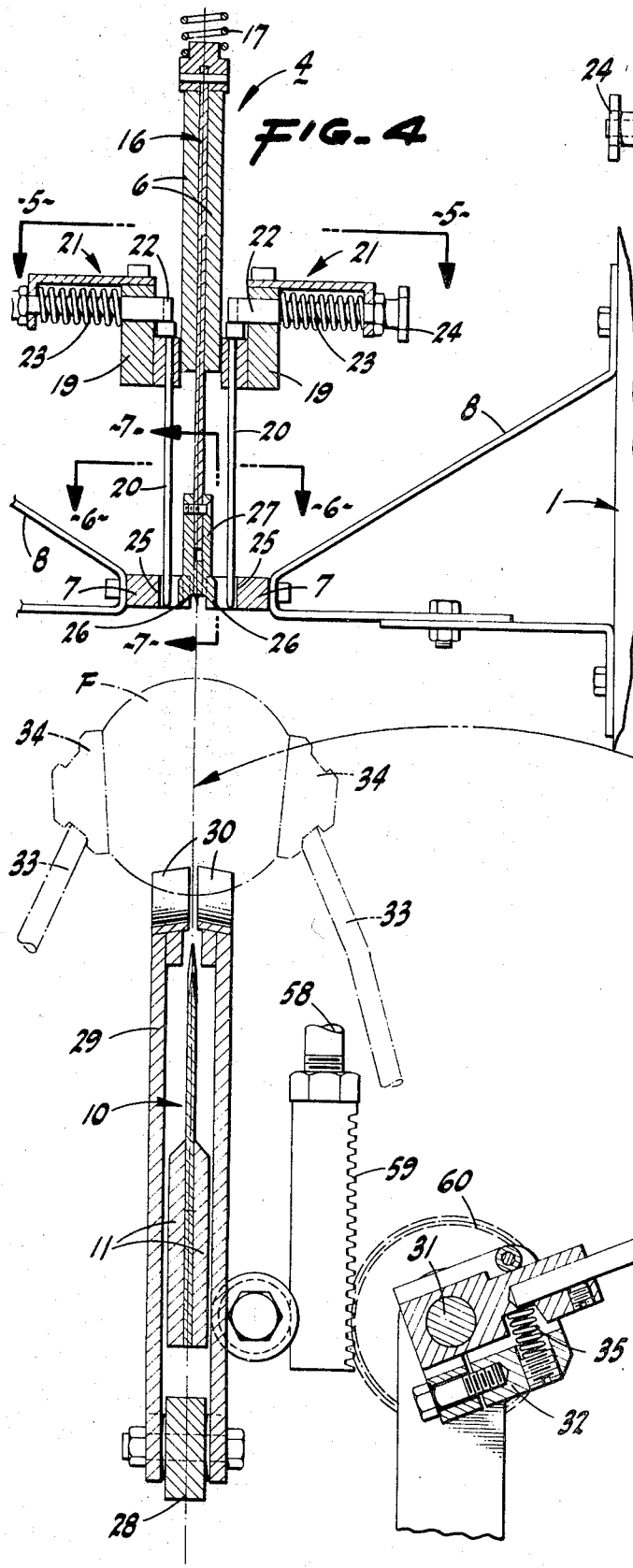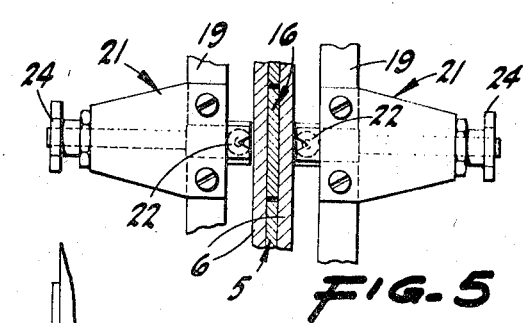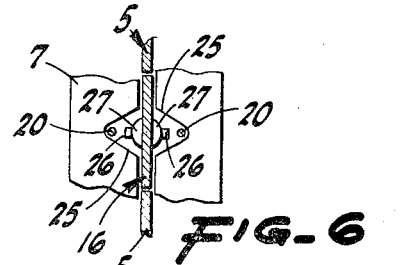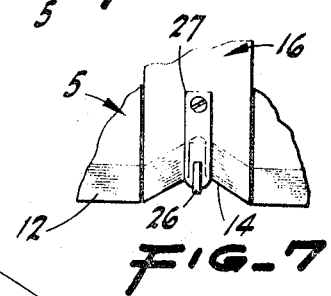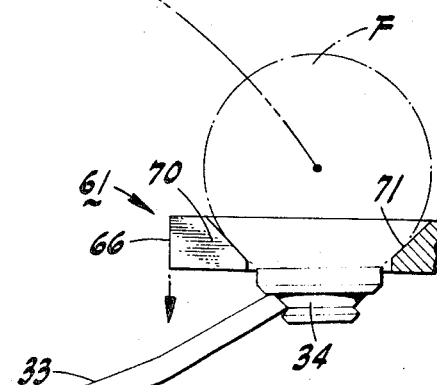

3,548,900

FREESTONE PEACH PITTING AND HALVING MACHINE

BACKGROUND OF THE INVENTION

The present invention represents the results of continued and extensive experimentation and development by me of automatic machines to halve and pit soft-fleshed freestone fruit (such as freestone peaches) which must not be bruised or otherwise damaged by severe engagement by parts of the machine when the same is in operation. The present invention embraces, in part, improvements in the concepts taught in my U.S. Pat. Nos. 3,138,184 and 3,182,698.

SUMMARY OF THE INVENTION

The present invention provides, as a major object, a machine which is operative to pit and halve freestone peaches (or other soft-fleshed freestone fruit) in a rapid and effective manner yet without any substantial or material bruising or other injury to the fruit halves as they are cut and separated from the pit; this being accomplished by a cyclicly operative array of parts arranged in novel structural combination.

The present invention provides, as another object, a freestone peach pitting and halving machine, as in the preceding paragraph, which in its cyclic operation cuts each individual fruit into halves, locks the pit in a stationary position, and then simultaneously pushes the cut fruit halves in a direction such that the stationary pit acts as an internal wedge which causes the cut fruit halves to effectively, and without damage, separate from such pit.

The present invention provides, as still another object, a freestone peach pitting and halving machine, as above, which—in the course of locking the pit in a stationary position—also holds together the separated pieces of the pit should the latter be what is known as a "split pit.". Thus, even though the pit be split, the machine is operative to employ such pit in the accomplishment of the internal wedge action hereinbefore noted.

The present invention provides, as an additional object, a freestone peach pitting and halving machine which comprises—in cooperative association with a rotary loader and in cyclicly operative array—a swinging cup assembly arranged to support individual fruit, received from the loader, in a predetermined (i.e. axially vertical) position between initially separated upper and lower blade units which then close and cut the fruit all about the pit and into fruit halves, there being retention means which—upon such cutting of the fruit and accompanying swinging away of the cup assembly—lock the pit against upward motion, and pushers thence operative to simultaneously engage from below and push the cut fruit halves upwardly relative to the locked-in-place pit so that the pit then acts as an internal wedge which causes the cut fruit halves to effectively separate from said pit as they are moved upward by the pushers.

The present invention provides, as a further object, a freestone peach pitting and halving machine which, while characterized by rapid operational speed and high capacity, runs smoothly and with the separated cut fruit halves and pits clearing the machine without any tendency to jam the same.

The present invention provides, as a still further object, a practical, reliable, and durable freestone peach pitting and halving machine, and one which is exceedingly effective for the purpose for which it is designed.

BRIEF DESCRIPTION OF THE DRAWINGS

FIG. 4 is an enlarged transverse sectional elevation taken substantially on line 4-4 of FIG. 1.

FIG. 5 is a fragmentary sectional plan taken substantially on line 5-5 of FIG. 4.

FIG. 6 is a fragmentary sectional plan taken substantially on line 6-6 of FIG. 4.

FIG. 7 is a fragmentary sectional elevation taken substantially on line 7-7 of FIG. 4.

DESCRIPTION OF THE PREFERRED EMBODIMENT

Figure 1:
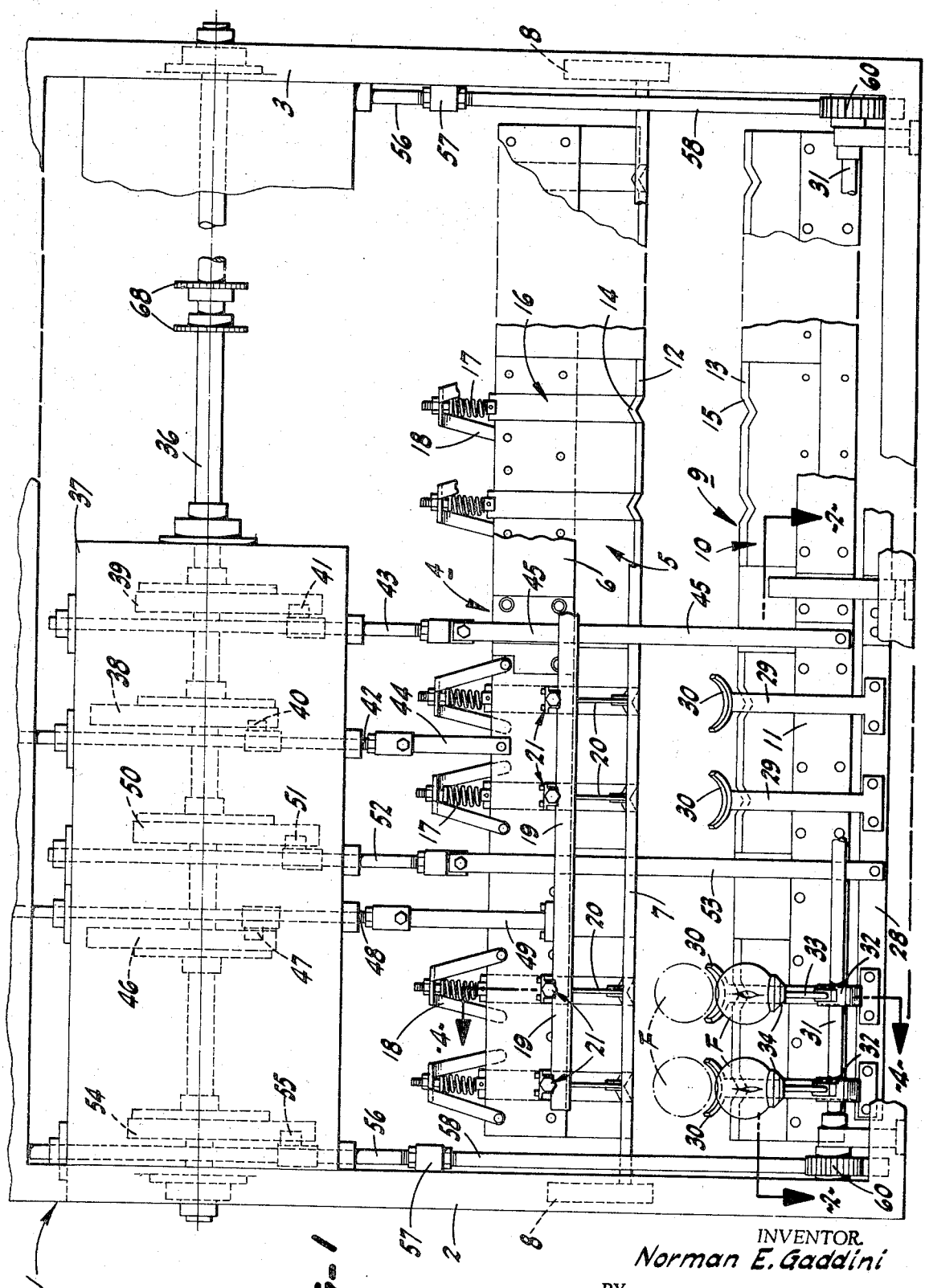
FIG. 1 is a foreshortened face elevation of the machine; the view, which omits the rotary loaders, being partly broken away and in the main showing one working section of such machine.
Figure 2:
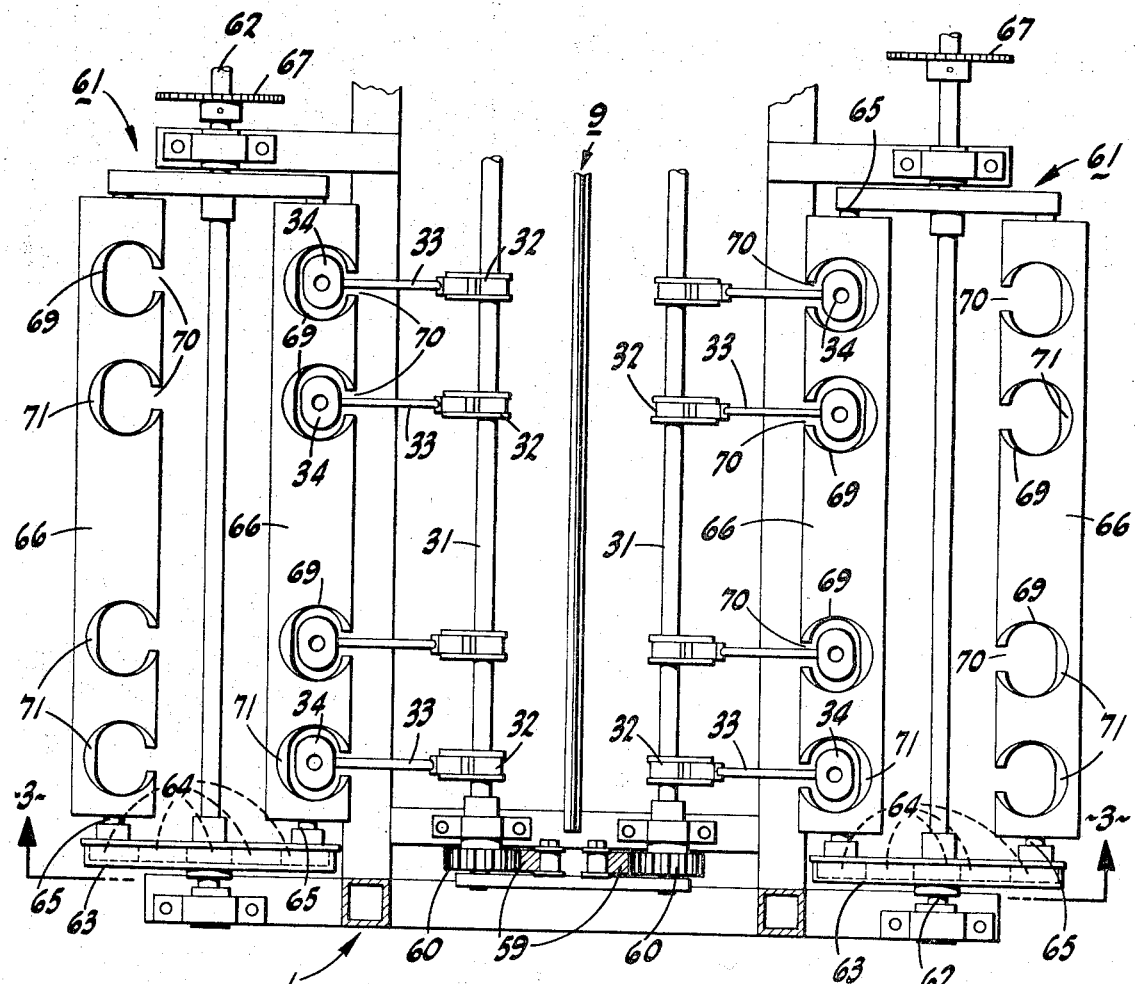
FIG. 2 is a fragmentary sectional plan taken substantially on line 2-2 of FIG. 1; the view including the rotary loaders.
Figure 3:
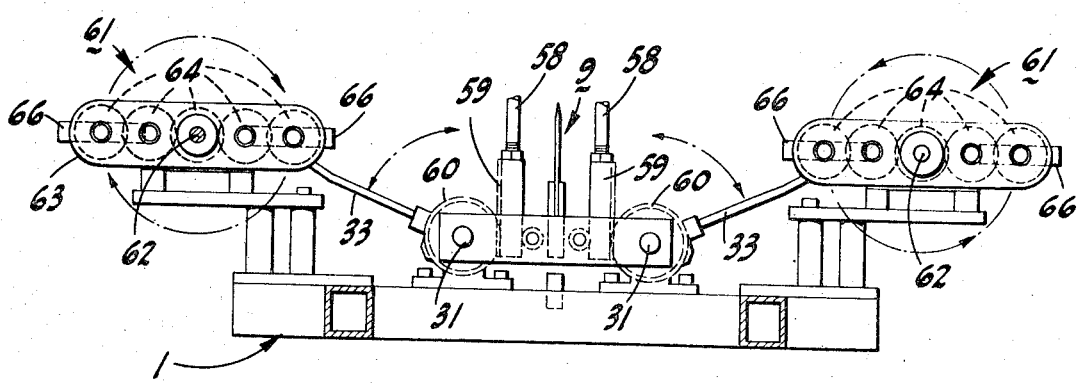
FIG. 3 is a fragmentary end elevation taken substantially on line 3-3 of FIG. 2.

Referring now more particularly to the drawings and to the characters of reference marked thereon, the machine comprises an open, upstanding frame, indicated generally at 1, which includes ends 2 and 3; the primary working parts of the machine (which in FIGS. 1—7, inclusive, are shown in full lines in the positions occupied thereby at the start of each cycle) being disposed between such frame ends 2 and 3 in an array which includes one section to the left of the transverse vertical centerline of the machine and another and substantially identical section to the right of such centerline. To facilitate disclosure and description only such one section, as will be apparent from FIG. 1, is mainly shown.

Intermediate the top and bottom of the frame 1 the machine includes a vertically disposed, longitudinally extending upper blade unit indicated generally at 4; such upper blade unit 4 (which is initially raised) including an upper blade 5 secured between and depending below elongated mounting plates 6. The upper blade unit is suitably guided for vertical reciprocation, in the frame 1, by means which includes transversely spaced guide bars 7 supported from said frame by brackets 8.

A cooperating vertically disposed, longitudinally extending lower blade unit, indicated generally at 9, is positioned in the frame 1 below the blade unit 4; such lower blade unit (which is initially lowered) being suitably guided in the frame for vertical reciprocation in exactly the same longitudinal vertical plane as said upper blade unit 4. The lower blade unit 9 includes a lower elongated blade 10 which is secured between and projects upwardly from mounting plates 11.

The blade units 4 and 9 are thus vertically spaced apart at the start of each cycle to permit prepositioning of individual fruit therebetween.

The upper blade 5 is sharpened to provide a lower cutting edge 12, while the lower blade 10 is sharpened to provide an upper cutting edge 13. Upon opposed reciprocation of the upper blade unit 4 and the lower blade unit 9—by means of the mechanism hereinafter described—the cutting edges 12 and 13 recurringly approach each other with a double "guillotine" effect.

At spaced points in the longitudinal extend thereof, the cutting edge 12 of blade 5 is formed with inverted V-shaped notches 14, while corresponding vertically aligned V-shaped notches 15 are formed in the cutting edge 13.

The inverted V-shaped notches 14 of the cutting edge 12 are, in fact, formed on the lower end of narrow, vertically extending, upwardly yieldable sections 16 of blade 5, and which sections 16 are suitably slidably mounted in connection with the upper blade unit 4. Each of the narrow, vertically extending, upwardly yieldable blade sections 16 is normally maintained in a lowered position by means of a compression spring 17 which is positioned between the upper end of said blade section 16 and a bracket 18 secured to and upstanding from the mounting plates 6 of the upper blade unit 4.

Longitudinally extending, needle-supporting and actuating bars 19 are disposed in spaced relation above the corresponding guide bars 7 and are adapted to be simultaneously vertically reciprocated by mechanism hereinafter described; each such bar 19 being provided—in the transverse vertical plane of each set of notches 14 and 15—with a depending spring steel needle 20. The upper end portions of the needles 20 are each engaged by a needle-retention unit 21 mounted on the related bar 19 and including a notched-end, spring-pressed plunger 22 which forcefully bears against the upper end portion of the related needle whereby such needle is releasably secured in place but can be readily released for adjustment or replacement. The spring-pressed plunger 22 of each needle-retention unit 21 is urged inwardly by a heavy-duty spring 23, and manual unloading of which spring—to release the related needle—can be accomplished by a pull knob 24. The needles 20 are of a length such that the lower end portions thereof extend normally into but not below openings 25 in the guide bars 7.

Each of the narrow, vertically extending, upwardly yieldable blade sections 16 is fitted at the apex of the corresponding sharpened notch 14 with opposed laterally outwardly and downwardly inclined ears 26 carried on vertical attachment fingers 27 secured to said blade section 16 by a screw, as shown. Such opposed ears 26, together with the opposed portions of each sharpened notch 14, form, in effect, a downwardly flaring cruciform; the related needles 20 being disposed adjacent but laterally out from said ears 26.

An elongated pusher-supporting and actuating bar 28 extends longitudinally below the lower blade unit 9 in spaced but vertically aligned relation therewith. In the transverse vertical plane of each set of notches 14 and 15, the bar 28 is provided with a pair of standards 29 between which the lower blade unit 9 is disposed; such standards 29 each being fitted at the upper end with an upwardly facing arcuate pusher 30, and which pusher may be of compound curvature with the working face sloping laterally outward. The pusher-supporting and actuating bar 28 is adapted to be reciprocated vertically by means of the mechanism hereinafter described; the pushers 30, when said bar 28 is in its initially lowered position, being disposed in a horizontal plane adjacent the plane of the cutting edge 13 when the lower blade unit 9 is also in its initially lowered position.

A pair of longitudinally extending, cup-supporting and actuating shafts 31 are journaled in the lower portion of the frame 1 with the lower blade unit 9 disposed centrally between such shafts. Each such shaft 31 is fitted—in the transverse vertical plane of each set of the sharpened cutting edge notches 14 and 15—with a mount 32 supporting a generally radial arm 33 fitted at its outer end with a fruit-engaging cup 34; such arms 33, in their initial position, extending at an upward and outward incline, and at which time the related cups 34 face directly upwardly. Each cup arm mount 32 is arranged in a manner, and with means which includes a compression spring 35, such that the related cup 34 can be stopped in a given position while permitting of slight continued rotation of the corresponding shaft 31. Each set of the cups 34 is adapted to be simultaneously swung upwardly and toward each other by means of the mechanism hereinafter described.

All in predetermined timed relation, the upper blade unit 4 and the lower blade unit 9 are reciprocated in opposition; the needles 20 reciprocated; the pushers 30 reciprocated; and the opposed related cups 34 swung toward and away from each other, by means of a rotary cam assembly comprising the following:

A longitudinal cam shaft 36 is journaled in the frame 1 adjacent the top thereof, and which cam shaft is constantly driven by any suitable means (not shown). Within a housing 37 the cam shaft 36 is fitted with internal cams 38 and 39 which, through the medium of followers 40 and 41, reciprocate rods 42 and 43 which depend to connection with tie links 44 and 45 connected at their lower ends to the upper blade unit 4 and the lower blade unit 9, respectively. The cams 38 and 39 are generated in a manner to cause opposed reciprocation of the upper blade unit 4 and lower blade unit 9, with a predetermined dwell in the open and closed positions of said blade units.

Another internal cam 46, working through the medium of a follower 47, reciprocates a rod 48 which depends to connection with tie links 49 secured at their lower ends to the needle-supporting and actuating bars 19 whereby said bars are simultaneously reciprocated; the cam 46 being generated to provide a predetermined dwell at the end of each stroke of said needle-supporting and actuating bars 19.

Still another internal cam 50, working through the medium of a follower 51, reciprocates a rod 52 which depends to connection with the upper end of a tie link 53; such tie link 53 being attached at its lower end to the pusher-supporting and actuating bar 28; the cam 50 being generated to provide a predetermined dwell of the pushers 30 at the end of each downward stroke.

An additional internal cam 54—on cam shaft 36 adjacent end 2 of the frame 1—works, through the medium of a follower 55, to reciprocate a rod 56 which depends to connection with a crosshead 57 having transversely spaced rods 58 depending therefrom; the rods 58 each being formed at the lower end with a rack 59 which meshes with a pinion 60 on the adjacent end of the corresponding cup-supporting and actuating shaft 31. As the rods reciprocate, the racks 59 and pinion 60 rotate the shafts 31 whereby to swing the arms 33 and cups 34 inwardly and outwardly; the cam 54 being generated to cause the said arms and cups to dwell a predetermined time at the end of each stroke.

Beyond each face of the machine, and laterally out a predetermined distance beyond the shafts 31, there is a rotary loader indicated generally at 61; such rotary loader being adapted to be hand-fed with fruit from the outer side, and on the inner side to deposit the fruit on the related cups 34 when the latter dwell in their outermost position.

Each rotary loader 61, which is of generally Ferris wheel type, comprises a longitudinal shaft 62 journaled in connection with the frame; such shaft (which is elongated) being fitted adjacent its ends with hollow radial housings 63 which project equal distances from such shaft. Each housing includes a gear train 64 adapted to simultaneously drive, from shaft 62, spindles 65 which project inwardly from the ends of said housing. A pair of traveling benches 66 extend longitudinally between the housings 63 equidistantly on opposite sides of the shaft 62; such benches being fixed at their ends to the corresponding spindles 65. The arrangement is such that upon rotation of the shaft 62, the benches 66 travel in a circular path but always remain horizontal; i.e. in upwardly facing relation irrespective of their position in such circular path. The direction of travel of the benches 66 is such that they rise on the outer side and lower on the inner side of each rotary loader 61.

The shaft 62 of each rotary loader 61 is constantly driven from the cam shaft 36 by suitable means—such as an endless chain assembly (not shown)—extending between sprockets 67 on the shaft 62 and corresponding sprockets 68 on said cam shaft 36.

Each of the traveling benches 66 is formed with a row of spaced, substantially circular openings 69 of a size and disposed to permit the related cups 34—when the latter are in their outermost position and upon lowering of the bench in its path of travel—to relatively pass through such openings 69; the benches being slotted, as at 70, between the openings 69 and the inner edges of the benches 66 to permit of relative passage of the outwardly extending arms 33 as the cups pass through said openings 69.

The openings 69 are each formed, about the periphery thereof, with an upwardly and outwardly inclined seat 71; such opening 69, together with the seat 71, being adapted to receive and support an individual fruit.

OPERATION

When the machine is in operation, with the rotary loaders 61 being constantly driven, one or the other of such loaders (or such loaders in alternation) are employed to feed the fruit pitting and halving mechanism. As to the rotary loader 61 which is in use, operators place individual fruit F over the openings 69 and on the seats 71 of the upwardly moving—and then outwardly disposed—bench 66; each fruit being disposed with its stem end facing outwardly and with the suture in a horizontal plane. Thereafter, as such fruit-carrying bench 66—traveling in its circular path—lowers on the back side of the loader (see FIG. 4), the related cups 34 (then dwelling in their outermost and upwardly facing position) relatively pass upwardly through the openings 69 and receive the fruit thereon without positional change.

Nextly, the cam 54 functions to simultaneously swing the opposed cups 34 of each set thereof upwardly and inwardly to what may be deemed a closed position (as shown in broken lines in FIG. 4) wherein the cups are disposed in adjacent but spaced facing relation with the fruit F gripped therebetween; the cups 34 then dwelling in such position for a predetermined time. The motion-compensating mounts 32 permit the cups to stop when fully engaged with the fruit; this being of particular advantage if the fruit is above average size.

With each set of dwelling cups 34 holding a fruit F in a predetermined position—wherein the stem end of the fruit is uppermost and the suture plane of the fruit coincident with the working plane of the upper blade unit 4 and lower blade unit 9—such blade units are forcefully moved toward each other, in the manner of a double guillotine, by means of the cams 38 and 39.

With such opposed or closing motion of the blade units 4 and 9, the fruit is cut, in the suture plane thereof, by the upper blade 5 and lower blade 10, all about the pit P and into halves; such cutting taking place with the pit directly between and engaged in holding relation by the inverted V-shaped, cutting edge notch 14 of the yieldable blade section 16 and the V-shaped, cutting edge notch 15 of the lower blade 10.

At or very shortly before completion of the halving of the fruit, as above, the cups 34 swing away and return to their outermost and starting position.

Figure 8:
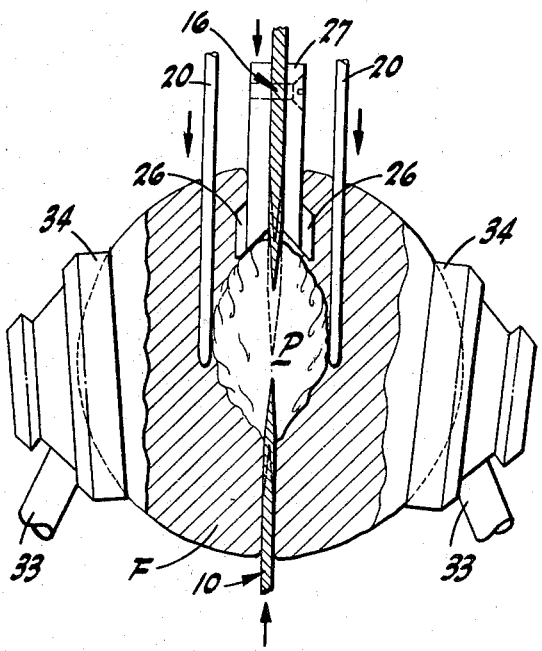
FIG. 8 is an enlarged transverse view showing, somewhat diagrammatically, a fruit as cup-supported, cut into halves, and with the pit locked in place by the retention means comprised of the closed blades, the ears thereon, and the needles.

Upon the fruit being cut into halves but remaining in position by virtue of the pit P being engaged between the cutting edge notches 14 and 15, the related needles 20 are lowered by means of the cam 46 and penetrate each cut fruit half in the manner shown in FIG. 8; the needles then dwelling for a predetermined time. When the needles penetrate the fruit halves, such needles engage and bear on opposite sides of the pit P; i.e. 90° from the plane of the cut.

With the blade units 4 and 9 continuing to dwell and remain closed with the pit P engaged between the cutting edge notches 14 and 15, the ears 26 bear against the top portion of such pit on opposite sides of the yieldable blade section 16; i.e. in the transverse plane occupied by the needles 20. The cutting edge notch 14, together with the corresponding opposed, laterally outwardly and downwardly inclined ears 26, provide, in effect, a cruciform in frustoconical pattern and which, together with the needles 20 penetrating the cut fruit halves and also engaging the pit, effectively lock the latter against upward axial motion.

The purpose of each narrow upwardly yieldable blade section 16 is to permit it to yield upwardly to compensate for the axial dimension of the pit P as engaged between the cutting edge notches 14 and 15.

Figure 9:
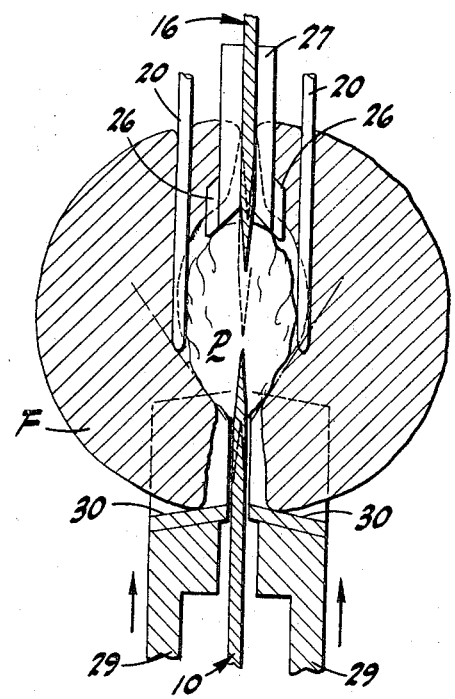
FIG. 9 is a similar view but shows the position of the cut fruit halves upon the pushers being partially raised.
Figure 10:
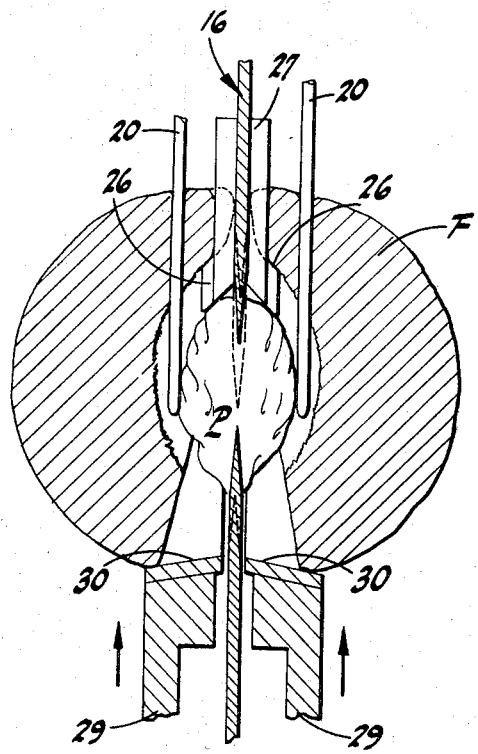
FIG. 10 is likewise a similar view but shows the completed separation of the cut fruit halves from the pit upon the pushers being fully raised.

With the pit P locked in place by the cutting edge notches 14 and 15, the ears 26, and the needles 20 serving in the nature of a cage the related curved pushers 30 (acting under the influence of cam 50) simultaneously rise on opposite sides of the closed blade units 4 and 9 and engage the corresponding cut fruit halves at the bottom. With continued upward motion of the pushers 30, in the progression illustrated in FIGS. 9 and 10, such fruit halves are shifted upwardly relative to the pit P. With such upward shifting of the cut fruit halves, the pit P acts as an internal wedge which forces said cut fruit halves laterally apart and effectively separates them from the pit; the ultimate separation being shown in FIG. 10.

Figure 11:
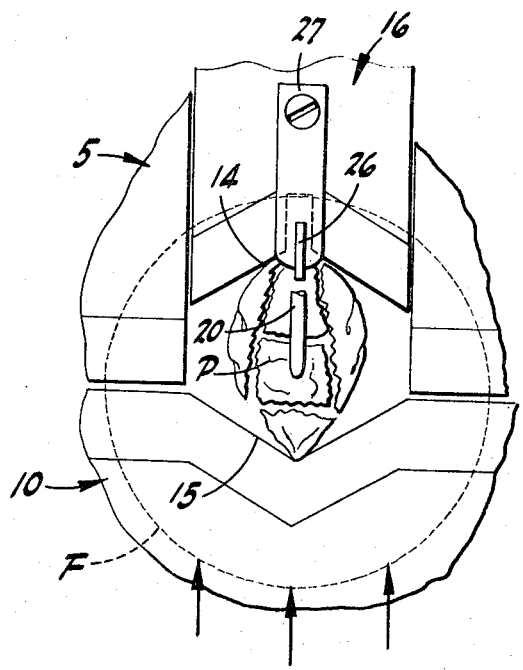
FIG. 11 is a view similar to FIG. 8 but taken 90° therefrom, i.e. in the vertical plane of the cut; the view showing retention of a split pit by the closed blades, the ears thereon, and the needles.

This same effective separation of the cut fruit halves from the pit is accomplished even though the pit may be a "split pit" as illustrated in FIG. 11. In such an instance the cutting edge notches 14 and 15, the ears 26, and the needles 20 also act to maintain the split parts of the pit together and against lateral separation so that the wedging action can occur.

After the cut fruit halves have been separated from the pit (whether it be a full pit as in FIGS. 8—10 or a split pit as in FIG. 11), the pushers lower to, and dwell in, their starting position.

At substantially the same time, the needles 20 move upward to, and dwell in, their raised and out-of-the-way position. Upon withdrawal of the needles 20 from the cut fruit halves (now separated from the pit), such halves cleanly drop away from the still closed blade units 4 and 9; the pit remaining engaged between said cutting edge notches 14 and 15.

As the cut fruit halves are dropped away, they are received below the pitting and halving mechanism, by a suitable carry-off conveyor (not shown).

Lastly, the blade units 4 and 9 open; i.e. retract in opposition and dwell in their open or starting positions. As the blade units 4 and 9 open, the pit P falls away and is likewise received on the aforesaid conveyor. The cut fruit halves and separated pits, as received on such conveyor, are segregated at a point beyond the instant machine.

Upon return of all of the parts of the described fruit pitting and halving mechanism to their initial or starting positions, the next cycle ensues; the cycling of such mechanism—under the influence of the described cam assembly—being smooth though rapid, and the relative positioning and movement of the parts assuring against any heavy impact against the fruit or the cut halves thereof.

A most important concept of the present invention is the locking in place of the pit followed by mechanical pushing of the cut fruit halves in a direction such that the pit, while remaining stationary, nevertheless acts as an internal wedge causing the desired separation of the cut fruit halves from said pit.

From the foregoing description, it will be readily seen that there has been produced such a freestone peach pitting and halving machine as substantially fulfills the objects of the invention, as set forth herein.

I claim:

1. A machine for pitting and halving freestone fruit comprising, on a frame, means to proposition each individual fruit, blade means operative to cut the prepositioned fruit about the pit and into halves, retention means arranged upon such cutting of the fruit to lock the pit stationary against motion in a direction axially of such prepositioned fruit, and pushers thereafter operative to engage and push the cut fruit halves in such direction so that the locked-in-place stationary pit acts as an internal wedge which causes separation of such cut fruit halves from said pit.

2. A machine, as in claim 1, in which said retention means includes elements associated with the blade means and engaging the pit upon completion of the cutting of the fruit; the blade means dwelling with said elements in pit engagement during operation of the pushers.

3. A machine, as in claim 1, in which the blade means includes opposed reciprocable blades initially spaced apart and between which the fruit is prepositioned with the stem end facing one blade and with the suture in the working plane of said blades, the latter being aligned in said plane and substantially closing together to cut the prepositioned fruit, and said retention means includes elements associated with said blades, and in part on said one blade, engaging the pit upon closing of the blades and completion of the cutting of the fruit thereby, the closed blades dwelling in such position during operation of the pushers.

4. A machine, as in claim 3, in which the elements of said retention means include opposed but cooperating notched cutting edge portions on the blades; such notched portions engaging opposite ends of the pit upon said closing of the blades; the notched portion corresponding to said one blade engaging the pit at the stem end of the fruit.

5. A machine, as in claim 4, including pit-engaging ears projecting centrally and laterally outward from the sides of said corresponding notched portion.

6. A machine, as in claim 4, in which such corresponding notched portion is formed on a separate section of said one blade, and such separate section being slidably mounted on said one blade and arranged to provide for spring-pressed but yieldable engagement of said corresponding notched portion with the pit at the stem end of the fruit upon said closing of the blades.

7. A machine, as in claim 3, in which the elements of said retention means include needles which, upon closing of said blades, move in a like direction to penetrate the cut fruit halves laterally out from but adjacent said working plane of the blades and to engage the pit on opposite sides thereof; the needles dwelling in said cut fruit half penetrating position during operation of the pushers.

8. A machine, as in claim 1, in which the means to preposition individual fruit includes a movable cup having an upwardly facing starting position; there being a rotary loader operative to deposit an individual fruit on the cup when the same is in such starting position.

9. A machine, as in claim 8, in which the cup is supported by a substantially radial arm, and the rotary loader is of Ferris wheellike construction with a traveling bench which always remains horizontal; the bench having an opening therein forming a fruit-supporting seat and a slot extending from such opening to an edge of the bench; the cup in its starting position, and upon travel of the bench, relatively moving through the opening whereby the fruit transfers from said seat to the cup, while at the same time the arm relatively moves through the slot.

10. A machine for pitting and halving freestone fruit comprising, on a frame, opposed reciprocable upper and lower blades initially vertically spaced apart, adjacent cutting edges of the blades having notched portions therein in aligned facing relation, means to preposition each individual fruit between the initially spaced apart blades with the suture of the fruit in the working plane of said blades and the stem end of the fruit facing the notched cutting edge portion of the upper blade, means to close the blades whereby to cut the fruit about the pit and into halves, the blades dwelling for a predetermined time in closed position and the notched cutting edge portions of the blades then engaging opposite ends of the pit, pushers initially disposed below the cut fruit halves, and means operative during the dwell of the blades to raise the pushers a distance to engage and push the cut fruit halves upward so that the blade-engaged pit then acts as a stationary internal wedge which causes separation of such cut fruit halves from said pit.

11. A machine, as in claim 10, in which the notched portion of the upper blade is of inverted V-form; there being pit engaging ears projecting laterally outwardly at a downward incline from the upper blade at the apex of said inverted V-form notched portion.

12. A machine, as in claim 10, including initially raised vertical needles corresponding to and disposed above the cut fruit halves, needle-lowering means operative upon closing of the blades but before raising of the pushers; the needles upon lowering thereof penetrating the cut fruit halves adjacent the working plane of the blades and engaging the pit on opposite sides thereof; the needles dwelling in lowered position during operation of the pushers.

13. A machine, as in claim 10, including, on the frame, first and second vertically reciprocable members, the blade-closing means including said first and second members and on which the blades are mounted, a third vertically reciprocable member, the pusher-raising means including said third member and on which the pushers are mounted, and a power-actuated cam assembly operative to reciprocate said first and second members in opposition and provide the related dwell when the blades are closed, and to reciprocate said third member so that raising of the pushers occurs during such dwell.

14. A machine, as in claim 13, including, on the frame, a fourth vertically reciprocable member, vertical needles corresponding to and disposed in initially raised position above the cut fruit halves, the needles being mounted on and depending from such fourth member, and the cam assembly being operative to reciprocate said fourth member to lower the same and the needles after closing of the blades, the needles upon lowering thereof penetrating the cut fruit halves adjacent the working plane of the blades and engaging the pit on opposite sides thereof; the cam assembly providing said fourth member and needles with a dwell in the lowered position thereof and during the raising of the pushers by said cam assembly.

15. A machine for pitting and halving freestone fruit comprising, on a frame, means to preposition each individual fruit, blade means operative to cut the prepositioned fruit about the pit and into halves, and holding and pusher means cooperating with the pit and cut fruit halves operative, respectively, to lock the pit stationary against motion axially of such prepositioned fruit and to effect motion of the cut fruit halves in such direction whereby the locked-in-place stationary pit acts as an internal wedge which causes separation of such cut fruit halves from said pit.

16. A machine, as in claim 15, in which the holding means includes elements which cooperate, in the nature of a cage, to lock the pit stationary against motion both axially and laterally of such fruit.

17. A machine, as in claim 1, in which the pushers correspond to and are substantially aligned with the cut fruit halves; the cut fruit half engaging face of each pusher being concave and sloping laterally outwardly.